United States Patent Office 3,294,735
Patented Dec. 27, 1966

3,294,735
STABILIZED POLYAMIDES CONTAINING A COPPER COMPOUND HAVING A HALOGEN ATOM DIRECTLY LINKED TO THE AROMATIC NUCLEUS
Ian C. Twilley, Petersburg, Va., and Frederick P. Poznick, Nabnasset, Mass., assignors to Allied Chemical Corporation, New York, N.Y., a corporation of New York
No Drawing. Filed Oct. 10, 1963, Ser. No. 315,388
7 Claims. (Cl. 260—45.75)

This invention relates to novel polyamide compositions, and more specifically to synthetic linear polyamides containing minor amounts of stabilizing compounds.

It is generally known that synthetic linear polyamides, when exposed to air at elevated temperatures as in shaping operations and in various useful applications, undergo degradation which results in depreciated physical properties. Various physical and chemical means have been employed in attempts to stabilize polyamides against such deterioration. Chemical additives although satisfactory in certain applications, often are not durably retained by the polymer in the course of manufacturing operations and in end uses of the polymer products involving contact with water. For example, mixtures of inorganic halides and copper compounds, as taught in U.S. Patent 2,705,227 are generally effective in stabilizing polyamide compositions until said compositions are washed or otherwise contacted by water, whereupon appreciable amounts of the halide stabilizing agent are lost and the stabilization of the composition is consequently diminished. A further disadvantage of previous chemical stabilizer additives has been that, in the relatively large amounts often required for satisfactory effectiveness, they tend to discolor the polyamide composition by reason of their inherent color or their action upon ingredients or impurities in the polyamide composition.

It is an object of this invention to provide a novel synthetic linear polyamide composition containing minor amounts of stabilizing compounds which are effective to minimize the adverse effects of heat and oxygen on said compositions at levels which do not impart severe discoloration to said compositions.

It is another object of this invention to prepare synthetic linear polyamide compositions of improved thermal and oxidative resistance, containing minor amounts of stabilizing compounds which minimize the adverse effects of heat and oxygen on said compositions and which stabilizers are themselves thermally stable so that they can be incorporated in the polyamide during polymerization thereof in the melt.

It is another object of this invention to prepare synthetic linear polyamide compositions of improved thermal and oxidative resistance, containing minor amounts of stabilizing compounds resistant to extraction by water from said compositions.

These and other objects and advantages will become apparent in the course of the following specification and claims.

The objects of this invention are accomplished, in general, by providing polyamide compositions containing a copper compound soluble in the molten polyamide and an aromatic amine containing at least one ring substituent of the group consisting of chlorine, bromine and iodine atoms, and soluble in the molten polyamide.

Illustrative examples of suitable specific aromatic amines of the stabilizer mixture of our invention are mono- and diiodoanilines, mono- and dibromoanilines, mono- and dichloroanilines; amino-monoiodobenzoic acids, amino-diiodobenzoic acids, etc.

The soluble copper compound of the stabilizer mixture is a compound which is soluble in the polyamide composition in the presence of the organic component of the stabilizer mixture to an extent necessary to secure stabilization. The copper compound may contain copper in any oxidation state and any type of chemical bonding including complexes. Illustrative examples of suitable specific soluble copper compounds include: cupric chloride, cupric iodide, cupric benzoate, cupric iodobenzoate, copper mono-2-ethylhexyl phosphate, cupric benzene sulfonate, ethylene diamine tetra-acetic acid/copper chelate, and the like.

Amounts of stabilizer mixture such as about .5% and less based on the weight of the polyamide composition are satisfactory in providing the improved polyamide compositions of this invention. It is preferable to employ weight ratios of aromatic amine:copper in the stabilizer mixture between about 5:1 and about 100:1. Amounts of copper compound desirably used in the reaction mixture provide between about 10 and about 300 p.p.m. of copper in the polymer (parts of copper per million parts by weight of polymeric amide).

The stabilizer mixture is preferably, for good dispersion, added to the monomeric reaction mixture prior to polymerization; but it can be added to the partially or completely polymerized polyamide by melt blending, solvent blending, coating and reextruding, or other suitable means.

The polyamides to which the present invention applies are the long chain polymeric amides having recurring amide groups as part of the chain and having weight average molecular weights of at least about 10,000, i.e. sufficient for fiber formation. The most common applicable polyamides are polyhexamethylene adipamide and polycaproamide. Other applicable polyamides include the polymers of alkylene and/or arylene dialkyl diamines with 4–10 carbon atoms between the amino groups, polymerized with dicarboxylic acids; poly-w-caprylamide, poly-w-lauroamide, etc. The invention is particularly useful with lactam polymers such as poly-ε-caproamide which are water-washed during the course of preparation.

The following examples are presented to illustrate preferred embodiments of the present invention and are not intended to be considered as limitative of the scope of the invention.

*Example 1*

ε-Caprolactam (1,900 grams) and 10 grams of water were heated in a glass beaker at 85° C. until melted. Cupric chloride dihydrate (0.48 gram), dissolved in 5 mls. of distilled water, and 8.1 grams of 2,4-dibromo aniline were then added to the molten caprolactam solution. The solution thus prepared was charged to a reactor and heated over a period of four hours to 225° C. under a 30 cc./minute inert dry gas sweep at a superatmospheric pressure of one inch of water. The temperature of the melt was maintained at 255° C. for a period of 13 hours. Under an inert gas superatmospheric pressure of four inches of water, the polymer was then extruded into a water quench bath, forming a 1/10" diameter strand which was subsequently chopped into 1/10" pellets.

The pellets were given four one-hour water washes at 100° C. to remove the residual monomer, and were dried under inert gas at 90° C. until the moisture content of the polymer was less than 0.2%. The copper content of the polymer was about 100 p.p.m.

The polymer pellets were molded in a conventional injection molding machine into A.S.T.M. microtensile specimens. The molded specimens were then placed in an air circulating oven at 120° C. or 160° C. The specimens were removed periodically and cooled in a sealed jar. After cooling, the specimens were tested for impact strength and tensile properties. When their properties show a sharp decrease, this is considered as the time of failure and is a measure of the heat stability of the polyamide composition.

In the same manner, polyamide compositions containing other stabilizer mixtures were prepared and tested. The results obtained, including comparative results obtained on unstabilized compositions, are presented in Table 1.

TABLE 1

| Blank (lettered) or Example (numbered) | CuCl$_2$·2H$_2$O, Percent by Weight Based on Caprolactam | Halogen Compound | Percent of Halogen Compound by Weight Based on Caprolactam | Heat Stability (Days) 160° C. | Heat Stability (Days) 120° C. |
|---|---|---|---|---|---|
| A | None | None | 0 | 1 | 7 |
| B | 0.026 | do | 0 | 6 | 45 |
| 1 | 0.026 | 2,4-dibromo aniline | 0.43 | 30 | ---------- |
| 2 | 0.026 | Iodo aniline (p- and o-) | 0.18 | 25 | ---------- |
| C | None | 2-amino-3,5-diiodobenzoic acid | 0.3 | 1 | ---------- |
| 3 | 0.026 | do | 0.14 | ---------- | 200 |
| 4 | 0.013 | do | 0.14 | ---------- | 200 |
| 5 | 0.013 | do | 0.30 | 30 | ---------- |

The stabilized compositions tested in Table 1 are non-discolored as prepared, and are resistant toward discoloration upon subsequent thermal-oxidative treatment. The results presented in Table 1 demonstrate the unexpected synergistic effects of the stabilizer mixtures of this invention, and illustrate the high level of heat stabilization of the polyamide compositions herein provided even after prolonged washing of said compositions. It is found that the iodo aromatic amines of the above examples are extracted from a polycaproamide composition only about 40–50% after complete processing of the composition including washing four times with 100° C. water for one hour each wash, in accordance with the above examples. The resistance of our halogenated aromatic amines to extraction may be connected with presence of the amino group. The exact mechanism of the coaction of the copper compound with the halogenated aromatic amine is not clearly explainable in the light of any existing theories of which we are aware. Other copper compounds can be substituted for cupric chloride in the procedure of the above examples and will give generally similar results, and likewise other halogenated aromatic amines can be substituted for those of the examples with similar results, provided the copper compound and the amine are both stable at the temperature employed for producing the polymer and are both soluble in the molten polymer. It is to be understood that a "soluble" compound in the sense the term is used herein includes compounds which undergo reaction with the polyamide and/or the monomers from which the polymer is formed, provided the resulting product is compatible with the molten polyamide.

The compositions of this invention can be modified by further incorporation of conventional additives such as delusterants, pigments, flame retardants, anti-static agents, and the like, depending upon the final form and end use of the polyamide composition. The improved polyamide compositions of this invention may be converted into end products such as textile yarns, tire yarns, bristles, films, castings, molded articles and other shaped articles.

We claim:

1. A composition of a polymeric amide having recurring amide groups as part of the polymer chain, of molecular weight sufficient for fiber formation, and minor effective amounts of a stabilizing mixture comprising a copper compound soluble in the molten polymer and an aromatic amine selected from the group consisting of aniline and aminobenzoic acid containing at least one ring substituent of the group consisting of chlorine, bromine and iodine atoms and soluble in the molten polymer.

2. The composition of claim 1 wherein said polyamide is poly-ε-caprolactam.

3. The composition of claim 1 wherein said substituent is iodine.

4. The composition of claim 1 containing homogeneously distributed therein about 10–300 p.p.m. of copper and about 5–100 parts by weight of aromatic amine per part of copper.

5. The composition of claim 4 wherein said aromatic amine is an iodo aniline.

6. The composition of claim 4 wherein said aromatic amine is 2-amino-3,5-diiodobenzoic acid and the copper compound is cupric chloride.

7. A process for production of poly-ε-caprolactam stabilized against heat and oxygen which comprises forming a polymerization reaction mixture comprising ε-caprolactam, a copper compound soluble in molten poly-ε-caproamide in amounts providing 10–300 p.p.m. of copper, and an aromatic amine selected from the group consisting of aniline and aminobenzoic acid containing at least one ring substituent of the group consisting of chlorine, bromine and iodine and soluble in molten poly-ε-caproamide said aromatic amine being in amounts of about 5–100 parts by weight of aromatic amine per part of copper; and maintaining said reaction mixture under polymerizing conditions.

References Cited by the Examiner

UNITED STATES PATENTS 2,960,489  11/1960  Gabler et al. _____ 260—45.75

FOREIGN PATENTS 3,816,770  9/1963  Japan.

LEON J. BERCOVITZ, *Primary Examiner.*

G. W. RAUCHFUSS, *Assistant Examiner.*